(12) United States Patent
Thurin et al.

(10) Patent No.: US 9,351,624 B2
(45) Date of Patent: May 31, 2016

(54) CLEANING IMPLEMENT

(71) Applicant: S.C. Johnson & Son, Inc., Racine, WI (US)

(72) Inventors: Matthew N. Thurin, Wauwatosa, WI (US); Joey Nakayama, Chicago, IL (US); Teddy Lu, Chicago, IL (US)

(73) Assignee: S. C. Johnson & Son, Inc., Racine, WI (US)

( * ) Notice: Subject to any disclaimer, the term of this patent is extended or adjusted under 35 U.S.C. 154(b) by 420 days.

(21) Appl. No.: 13/916,189

(22) Filed: Jun. 12, 2013

(65) Prior Publication Data

US 2013/0333725 A1    Dec. 19, 2013

Related U.S. Application Data

(60) Provisional application No. 61/661,192, filed on Jun. 18, 2012.

(51) Int. Cl.
| | | |
|---|---|---|
| *A47L 13/20* | (2006.01) | |
| *A47L 13/16* | (2006.01) | |
| *A47L 13/38* | (2006.01) | |
| *B32B 7/04* | (2006.01) | |
| *B32B 7/06* | (2006.01) | |

(52) U.S. Cl.
CPC .............. *A47L 13/16* (2013.01); *A47L 13/38* (2013.01); *B32B 7/045* (2013.01); *B32B 7/06* (2013.01); *B32B 2432/00* (2013.01)

(58) Field of Classification Search
CPC ....... A47L 13/20; A47L 13/256; A47L 13/16; A47L 13/38

USPC ............ 15/208–210.1, 229.4, 229.8, 104.93, 15/104.94
See application file for complete search history.

(56) References Cited

U.S. PATENT DOCUMENTS

| | | | |
|---|---|---|---|
| 1,231,168 A | 6/1917 | Jones | |
| 2,821,731 A | 2/1958 | May | |
| 4,145,787 A | 3/1979 | Bastian | |
| 4,441,228 A * | 4/1984 | Marquart | A47L 13/252 15/229.8 |
| 4,670,930 A | 6/1987 | Lu | |
| 4,756,529 A | 7/1988 | Stillinger | |
| 5,010,617 A | 4/1991 | Nelson | |
| 5,280,664 A | 1/1994 | Lin | |

(Continued)

FOREIGN PATENT DOCUMENTS

| | | | |
|---|---|---|---|
| EP | 1723885 A1 | 11/2006 | |
| EP | 1992268 A1 | 11/2008 | |

(Continued)

OTHER PUBLICATIONS

PCT/US2013/045437 International Search Report dated Nov. 29, 2013.

*Primary Examiner* — Laura Guidotti (57) ABSTRACT

A cleaning implement is disclosed with a support sheet having a first surface, a second surface, and a longitudinal axis. A plurality of detachable cleaning sheets, each having an outwardly facing cleaning surface and an inwardly facing attachment surface, may be supported by the support sheet in a stacked configuration. A plurality of folded portions included with the support sheet and the cleaning sheet extend generally radially from the longitudinal axis of the cleaning implement. The outermost cleaning sheet may be removed from the stacked cleaning sheet to expose a new, fresh cleaning sheet.

20 Claims, 11 Drawing Sheets

(56) References Cited

U.S. PATENT DOCUMENTS

| | | |
|---|---|---|
| 5,299,877 A | 4/1994 | Birden |
| 5,343,880 A | 9/1994 | McKay |
| 5,405,450 A | 4/1995 | Mifsud |
| 5,553,344 A | 9/1996 | Rosenkrantz |
| 5,639,532 A | 6/1997 | Wells |
| 5,813,080 A | 9/1998 | Hendrwn |
| 5,953,784 A | 9/1999 | Suzuki et al. |
| 5,960,509 A | 10/1999 | Wu |
| 5,971,645 A | 10/1999 | Fukushima et al. |
| 5,996,162 A | 12/1999 | Hsu |
| 6,026,534 A | 2/2000 | Gonda et al. |
| 6,047,435 A | 4/2000 | Suzuki et al. |
| 6,192,543 B1 | 2/2001 | Lee |
| 6,243,909 B1 | 6/2001 | Graham et al. |
| 6,272,716 B1 | 8/2001 | Thornton |
| 6,275,995 B1 | 8/2001 | Le Gette et al. |
| 6,298,517 B1 | 10/2001 | McKay |
| 6,360,373 B1 | 3/2002 | Rehn et al. |
| 6,405,403 B1 | 6/2002 | McKay |
| 6,601,260 B2 | 8/2003 | Lenaghan |
| 6,735,809 B2 | 5/2004 | Parks |
| 6,766,552 B1 | 7/2004 | Policicchio et al. |
| 6,810,554 B2 | 11/2004 | McKay |
| 7,107,643 B1 | 9/2006 | McKay |
| 7,293,317 B2 | 11/2007 | Tsuchiya et al. |
| 7,307,055 B2 | 12/2007 | Cook et al. |
| 7,350,257 B2 | 4/2008 | McKay |
| 7,404,227 B2 * | 7/2008 | Otsuka .................. A47L 13/20 15/208 |
| 7,478,453 B1 | 1/2009 | Busshaus |
| 7,530,138 B1 | 5/2009 | Platt |
| 7,571,510 B2 | 8/2009 | Yamada |
| 7,603,739 B2 | 10/2009 | Minkler et al. |
| 7,730,574 B1 | 6/2010 | Cox, Sr. |
| 7,784,137 B2 | 8/2010 | Knopow |
| 7,824,120 B1 | 11/2010 | Kasper et al. |
| 7,827,650 B2 | 11/2010 | Levy et al. |
| D632,855 S | 2/2011 | Quinlan et al. |
| 7,895,768 B2 | 3/2011 | Vossoughi et al. |
| 7,958,591 B1 | 6/2011 | Rogers |
| 2004/0040109 A1 | 3/2004 | Lee |
| 2005/0108843 A1 * | 5/2005 | Michaels ................ A47L 13/20 15/210.1 |
| 2006/0010634 A1 | 1/2006 | Moser et al. |
| 2006/0272115 A1 | 12/2006 | Kacher et al. |
| 2007/0028409 A1 * | 2/2007 | Yamada .................. A47L 13/38 15/226 |
| 2007/0256261 A1 | 11/2007 | Benitez, Jr. et al. |
| 2008/0028560 A1 | 2/2008 | Policicchio et al. |
| 2008/0271272 A1 | 11/2008 | Righetto |
| 2010/0028072 A1 | 2/2010 | Suda |
| 2011/0041276 A1 | 2/2011 | Edwards et al. |

FOREIGN PATENT DOCUMENTS

| | | |
|---|---|---|
| EP | 2308361 A1 | 4/2011 |
| WO | 9963879 A1 | 12/1999 |
| WO | 2011061907 A1 | 5/2011 |

* cited by examiner

CLEANING IMPLEMENT

CROSS-REFERENCE(S) TO RELATED APPLICATION(S)

This application claims a benefit of priority based on U.S. Provisional Patent Application No. 61/661,192, filed Jun. 18, 2012, the entire contents of which are hereby expressly incorporated by reference into the present application.

BACKGROUND OF THE INVENTION

The present invention relates generally to a cleaning implement, and more specifically to a cleaning implement that may be used for household dusting.

SUMMARY OF THE INVENTION

The present invention provides a novel cleaning implement that enables the user to refresh the cleaning implement multiple times without the need to dispose of or replace the cleaning implement, and further provides a method relating to use of the cleaning implement.

The cleaning implement may include a support having a longitudinal axis, a plurality of cleaning sheets each having outward facing cleaning face and an inward facing attachment face, removably attached to the support, and a plurality of folded portions extending from the cleaning sheets and generally radially from the longitudinal axis of the support. The support may be any one of a flexible sheet, a pocket, a cleaning sheet, and an intermediate attachment sheet. A series of slits in the support and the cleaning sheets may be further included that form a plurality of loops in the folded portions of the support and the cleaning sheets. Alternatively, a series of slits may be included only in each cleaning sheet that forms a plurality of loops in the folded portions of the cleaning sheets. The plurality of cleaning sheets may be attached to the support with any one of an adhesive, a stitching, a fusion bonding, and a heat sealing bond. The support may also be attached to the cleaning implement with a pocket structure formed from a separate, nonwoven sheet.

The plurality of cleaning sheets are preferably layered in a stacked configuration such that only the outwardly facing cleaning face is exposed to ambient. The cleaning sheets are also preferably configured to allow detachment of a cleaning sheet, thus exposing to the ambient an additional cleaning sheet in the stacked configuration as a cleaning sheet is removed from the stack. A cleaning solution may be impregnated into the cleaning sheets to assist in dust removal and surface cleaning or disinfecting. In order to visually identify that the cleaning sheets are running out, a final cleaning sheet in contact with the support may include an indicia visually distinguishing it from the plurality of cleaning sheets. The indicia of the final cleaning sheet may also include a color distinct from a color of the plurality of cleaning sheets. To assist a user in cleaning with the cleaning implement, a holding space may be included in the support and configured to receive a handle.

In another embodiment, the cleaning implement may include a support sheet having a first surface, a second surface, and a longitudinal axis. The cleaning implement may include a plurality of detachable cleaning sheets, each having an outwardly facing cleaning surface and an inwardly facing attachment surface supported by the support sheet in a stacked configuration. A plurality of folded portions included with the support sheet and the cleaning sheet may extend generally radially from the longitudinal axis of the cleaning implement. A means to allow detachment of the inwardly facing surface of each cleaning sheet, allows a user to expose an additional cleaning sheet in the stacked configuration to the ambient. A final cleaning sheet may be included in the stack of cleaning sheets in contact with the support sheet, and one cleaning sheet may include indicia visually distinguishing it from the plurality of cleaning sheets, for alerting a user to refill the cleaning sheets. A cleaning solution may be impregnated into the cleaning sheets to assist in dusting, cleaning, and disinfecting.

A holding space may also be included in the support sheet and configured to receive a handle. To help increase contact area with the surface to be cleaned, a series of slits may be included in the support sheet and the cleaning sheets that form a plurality of loops in the folded portions of the support and the cleaning sheets. The cleaning sheet may be attached to each other with one of an adhesive, a stitching, a fusion bonding, and a heat sealing bond to attach the plurality of cleaning sheets to each other and the support sheet.

Also disclosed is a method of cleaning. The steps may include providing a cleaning implement that has a support sheet and a plurality of additional removable sheets, wherein the sheets have a plurality of folded portions that radially extend from a longitudinal axis of the cleaning implement. The steps may also include contacting an outermost sheet with a surface to be cleaned, using the outermost sheet to trap dust or other debris that is on the surface to be cleaned, and removing the outermost sheet from the cleaning implement to expose an unused sheet until just the support sheet remains. Lastly, the steps may include attaching the cleaning implement to a handle via the support sheet.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The present invention is illustrated in the accompanying drawings in which like reference numerals represent like parts throughout.

In the drawings.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

The present invention and the various features and advantageous details thereof are explained more fully with reference to the non-limiting embodiments described in detail in the following description.

A cleaning implement 10 is shown in FIGS. 1, 2, 5, 6, 9, and 10. The cleaning implement 10 includes a support 20, e.g., a support sheet 20, and a plurality of cleaning sheets 30 that are supported by the support 20. The support 20 is preferably in the form of a sheet, though the support 20 could have any form suitable for supporting the cleaning sheets 30 during the dusting operation. For purposes of this application, the support 20 will be referred to as a support sheet 20.

Figure 5:
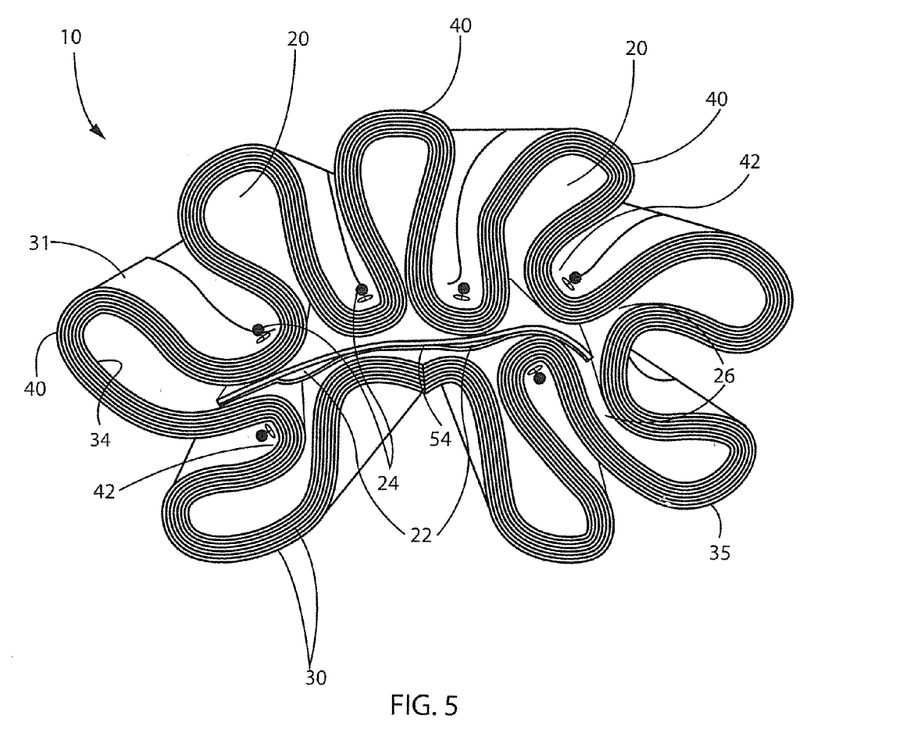
FIG. 5 is an end view of the cleaning implement of FIG. 1.
Figure 6:
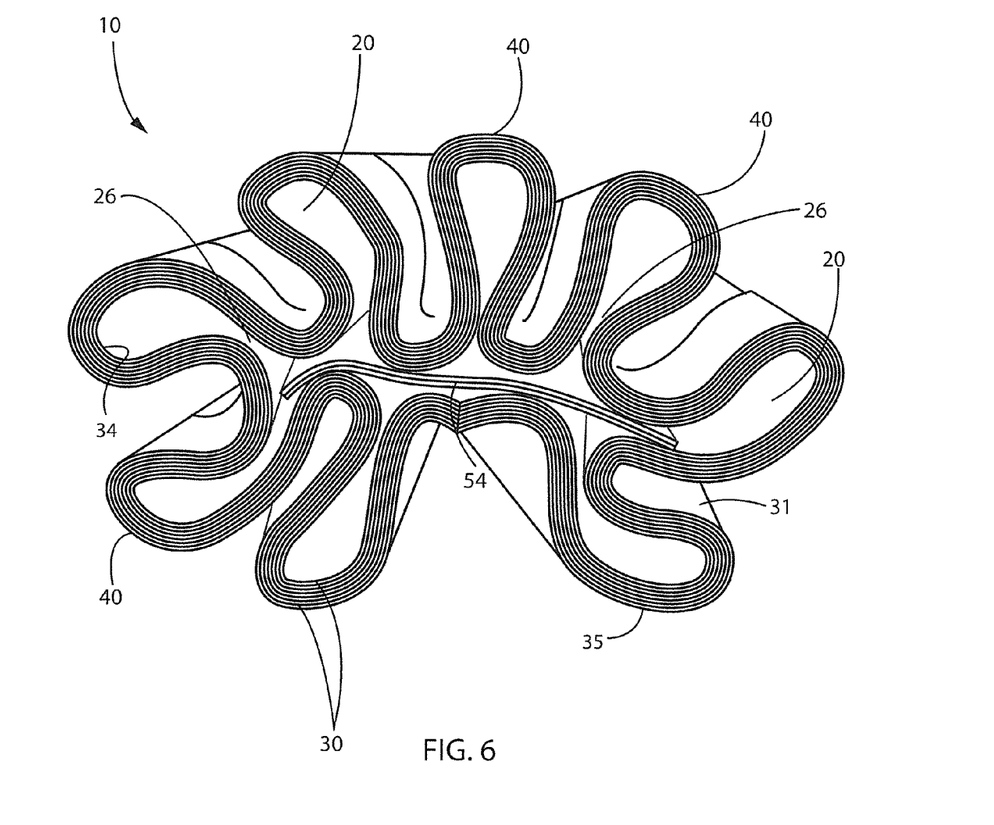
FIG. 6 is another end view of the cleaning implement of FIG. 1.

As shown in FIGS. 5 and 6, the support sheet 20 and the cleaning sheets 30 are arranged about a longitudinal axis 11 of the cleaning implement 10. In this way, the support sheet 20 and cleaning sheets 30 form the body of the cleaning implement 10. The support sheet 20 and the cleaning sheets 30 may be rectangular in shape and have generally the same dimensions. Conversely, the support sheet 20 and cleaning sheets 30 may have different dimensions. Regardless, the support sheet 20 and cleaning sheets 30 are preferably sized so as to be effective for use as a hand-held cleaning implement. For example, in one embodiment the cleaning sheets may be about 50 cm by about 16 cm and weigh about 4 grams. In another embodiment, the cleaning sheets may be about 75 cm by about 18 cm and weigh about 7 grams.

The plurality of cleaning sheets 30 is attached to and supported by the support sheet 20. The plurality of cleaning sheets 30 may be attached directly to the support sheet 20, whereby the final cleaning sheet 34, that is most radially inwardly with respect to the longitudinal axis 11, is attached to the support sheet 20. The outer-most cleaning sheet 35 is the sheet available for contacting a surface to be cleaned. The cleaning sheet 30 may be attached via any suitable method such as by adhesive, stitching, fusion bonding, or heat sealing. The cleaning sheets 30 include a cleaning face 31 and an attachment face 33. The cleaning face 31 of each cleaning sheet 30 is the surface intended to contact a surface to be cleaned. The attachment face 33, shown in FIG. 10, contacts the cleaning face 31 of the next radially inward cleaning sheet 30 and is held to it with one of the adhesive, stitching, fusion bonding, or heat sealing. Alternatively, the plurality of cleaning sheets 30 may be attached to an intermediate attachment structure (not shown) that is in turn attached to the support sheet 20. In such a configuration, the intermediate attachment structure would be considered to form part of the support sheet 20.

Figure 10:
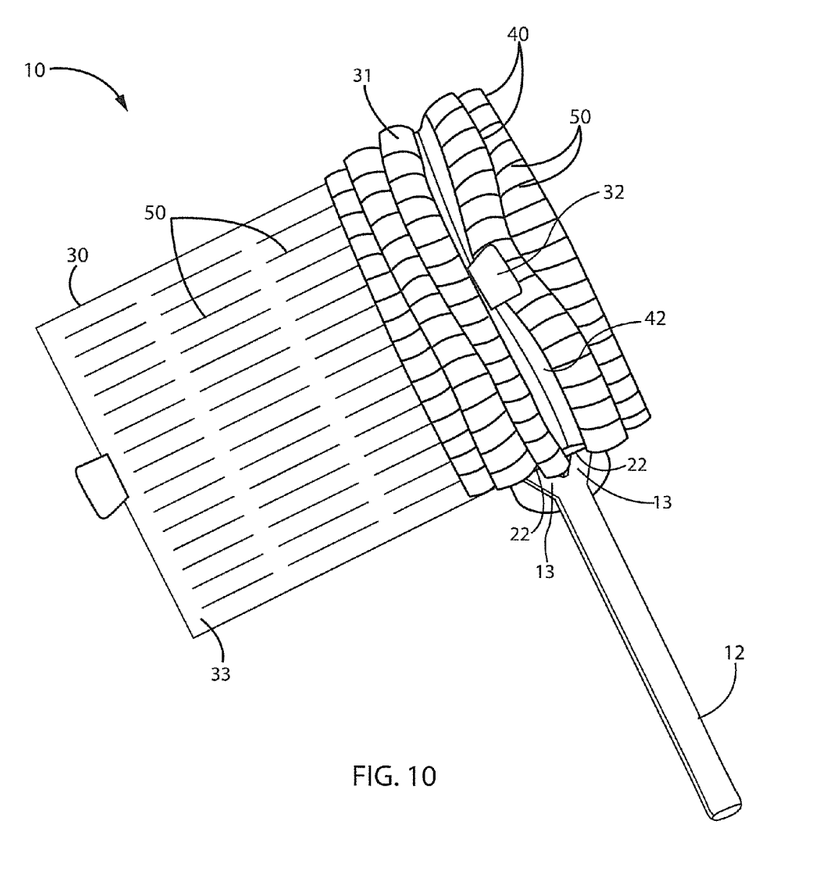
FIG. 10 shows another embodiment of the cleaning implement of the present invention, where a cleaning sheet is being removed from the cleaning implement.

The cleaning sheets 30 are configured so that the outermost cleaning sheet 30 is removable from the plurality of cleaning sheets 30, as shown in FIG. 10. Thus, during use, a user may remove the outermost cleaning sheet 35 once that cleaning sheet 30 has become soiled and has an undesirable level of efficacy with respect to dust removal. The user may simply peel away the outermost cleaning sheet 30 to expose the next, unused cleaning sheet 30.

The ease with which the cleaning implement 10 may be refreshed is desirable to the user. In other words, the user may refresh the cleaning implement 10 numerous times without the need to completely replace the cleaning implement 10 or the need to clean the cleaning implement 10 itself, e.g., in the washing machine or the sink, or shaking the cleaning implement 10 outside. Thus, the removable cleaning sheets 30 of the cleaning implement 10 enable a user to clean for a greater period of time with minimal interruption, the minimal interruption being the removal of the outermost cleaning sheet 30 when it becomes too soiled and/or experiences reduced cleaning efficacy. Put another way, comparing a conventional cleaning implement to an embodiment of the cleaning implement 10 having ten cleaning sheets 30, a user would have to replace the conventional cleaning implement ten times once the cleaning implement became soiled and/or experienced reduced cleaning efficacy, which is time consuming and costly, as opposed to simply removing a cleaning sheet 30 from the cleaning implement 10, which is far more efficient and less time consuming.

The cleaning sheets 30 may be secured together using any suitable means that provides for the easy removal of the cleaning sheets 30 from the cleaning implement 10 while at the same time preventing inadvertent removal of the cleaning sheets 30 under the typical forces experienced during household dusting. For example, the cleaning sheets 30 may be attached to one another via stitching, adhesive, fusion bonding or heat sealing. In one embodiment, the sheets are attached to one another via a plurality of attachment members 24, described in further detail below. See FIGS. 11 and 12. Each of the cleaning sheets 30 may further include a removal member 32, e.g., a tab, that facilitates removal of a cleaning sheet 30 from the plurality of cleaning sheets 30.

The cleaning sheets 30 are made from a material that is flexible and that has properties enabling the cleaning sheet 30 to collect and retain dust and other debris. In one embodiment, the cleaning sheets 30 are nonwoven sheets, for example a 35-55 gsm spunlace nonwoven material. Such material may be 100% polyester, or it may be substantially polyester with microfiber of nylon. In another embodiment, the innermost cleaning sheet 30 could be made of a thicker material, such as 90-110 gsm spunlace nonwoven, to provide additional support and structure to the cleaning implement 10 and to the plurality of cleaning sheets 30. Moreover, the cleaning sheets 30 may be impregnated with a cleaning solution to further facilitate dust removal. Additionally, the cleaning sheets 30 may include an adhesive to further improve dust removal and retention. In one embodiment, the adhesive could be applied to valleys 42. Further, the cleaning sheets 30 and support sheet 20 may be different colors. Thus, when a user has reached the last cleaning sheet 30, the support sheet 20 may serve as an indicator of the last cleaning sheet 30. Alternatively, the final cleaning sheet 30 could be colored differently than the other cleaning sheets 30 or contain some other indicia notifying the user that it is the last cleaning sheet 30.

The support sheet 20 and cleaning sheets 30 are configured about the longitudinal axis 11 of the cleaning implement 10 so as to form a plurality of folded portions 40. As shown in FIGS.

1 and 2, the folded portions 40 generally extend along the longitudinal axis 11 of the cleaning implement 10. The folded portions 40 may be configured in alternative arrangements that do not extend along the longitudinal axis 11 of the cleaning implement 10. For example, the folded portions 40 may be configured to spiral around the longitudinal axis 11. In any event, the folded portions 40 extend radially away from the longitudinal axis 11 to facilitate dust removal and dust retention during the dusting process. For example, folded portions 40 may be used to clean hard-to-reach places that are not easily accessible using a conventional cleaning implement such as a dusting rag. In between the folded portions 40 are valleys 42. Thus, looking at an end view of the cleaning implement 10, the folded portions 40 and valleys 42 of the support sheet 20 and cleaning sheets 30 generally follow a wave-like pattern around the longitudinal axis 11 of the cleaning implement 10. See FIGS. 5 and 6.

Moreover, the folded portions 40 create a three-dimensional cleaning surface area as opposed to the generally two dimensional cleaning surface areas of conventional fiber bundle dusters. The three-dimensional surface area of the cleaning implement 10 can easily and quickly be refreshed by removing the outermost cleaning sheet 30, whereas a conventional fiber bundle duster cannot be refreshed—it must be replaced or cleaned in some other way. Moreover, the height of the folded portions 40 corresponds to the resiliency, or "floppiness," of the cleaning implement 10. The greater the height of the folded portions 40, the floppier the cleaning implement 10 will be. Conversely, the shorter the height of the folded portions 40, the stiffer the cleaning implement 10 will be.

The support sheet 20 may be made of a flexible, resilient material that will substantially maintain its shape after exposure to typical forces of normal household dusting. In one embodiment, the support sheet 20 is made from 15-25 gsm polypropylene spunbond. Thus, the folded portions 40 of the support sheet 20 will similarly be flexible and resilient during the dusting process while maintaining its shape. The overall shape of the cleaning implement 10 will be substantially unchanged after dusting, which extends the longevity and effectiveness of the cleaning implement. The resilient nature of the cleaning implement 10 is a desirable quality to consumers as consumers do not like when a cleaning implement quickly loses its shape.

The cleaning sheets 30, when attached to the support sheet 20, substantially conform to the shape of the support sheet 20. Prior to assembly into the cleaning implement 10, the support sheet 20 may be rectangular in shape. The plurality of cleaning sheets 30 may also be rectangular in shape and attached to the support sheet 20 when the cleaning implement 10 is in an unassembled form. When assembled into the cleaning implement 10, the support sheet 20 is configured about the longitudinal axis 11 of the cleaning implement 10 to form the folded portions 40, a configuration that is similarly adopted by the cleaning sheets 30. The parts of the support sheet 20 may be secured, for example to other parts of the support sheet 20, in order to maintain the folded portions 40. Alternatively, the support sheet 20 may be formed or processed to maintain the folded portions 40, in other words, so that the final shape of the support sheet 20 that forms the cleaning implement 10 is the natural state of the cleaning sheet 20.

In one embodiment, a plurality of attachment members 24 is used to maintain the shape of the cleaning implement 10 and also to secure the cleaning sheets 30 to one another. The attachment members 24 may be stitching, a heat seal, a fusion bond, a pin, or any other structure capable of holding the support sheet 20 and cleaning sheets 30 together so as to maintain the shape of the cleaning implement 10. Alternatively, the attachment members 24 that hold the cleaning sheets 30 together may be separate from attachment members 24 that secure the cleaning sheets 30 to the support sheet 20. There may be further attachment members 24 that hold various portions of the support sheet 20 together. In sum, there are three functions performed by attachment members 24: (1) securing the cleaning sheets 30 to one another in a way that individual cleaning sheets 30 are removable from the stack of cleaning sheets 30, (2) securing the plurality of cleaning sheets 30 to the support sheet 20 (3), and securing portions of the support sheet 20 to one another to form the overall shape of the cleaning implement 10. The attachment members 24 may serve one, all, or any combination of these functions.

Figure 11:
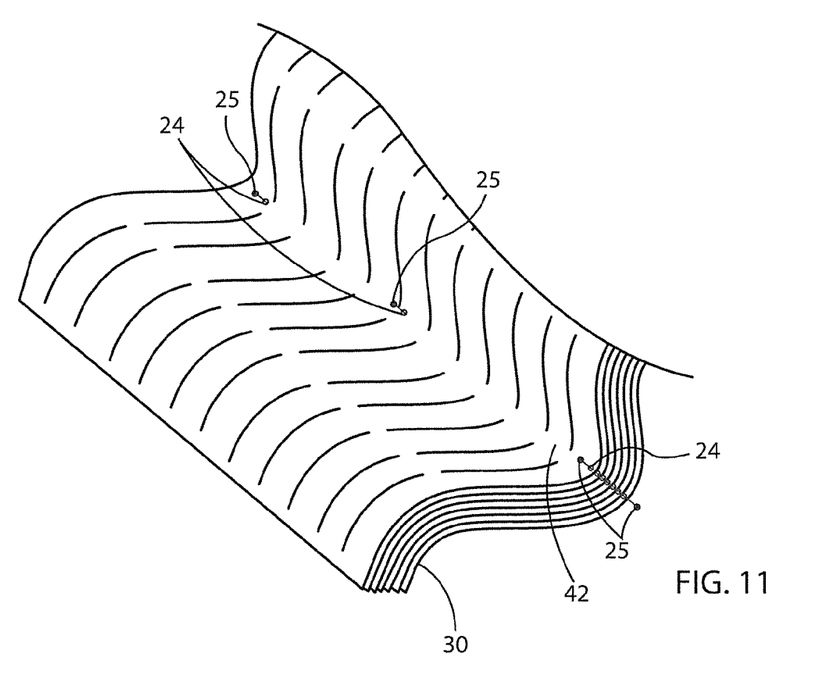
FIG. 11 shows a plurality of cleaning sheets being secured together with an attachment member.
Figure 12:
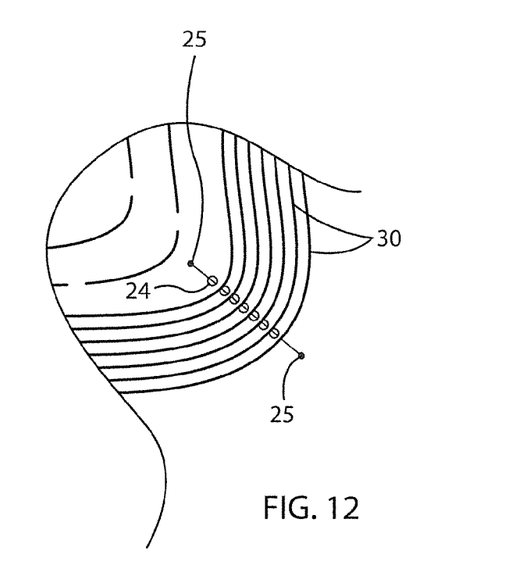
FIG. 12 shows a closer view of a plurality of cleaning sheets being secured together with an attachment member.

As shown in FIG. 11, each valley 42 has a series of attachment members 24, in this case three, spaced apart through the valley 42 along a line that is substantially parallel to the longitudinal axis 11 of the cleaning implement 10. The attachment members 24 are in the form of pins or rods, and each attachment member 24 has head portions 25 on either end of the attachment member that secure the plurality of cleaning sheets 30 between the respective head portions 25. Accordingly, when the outermost cleaning sheet 30 is peeled away, force is not exerted on the adjacent cleaning sheet 30 because adjacent cleaning sheets 30 are not directly bonded to one another. Thus, the only the outermost cleaning sheet 30 will be removed and the remaining cleaning sheets 30 will stay secured together. Alternatively, the attachment members 24 could be in the form of a string with knotted ends, which would function similarly to the pin/head configuration described above.

In the embodiment shown, for example in FIGS. 5 and 6, the support sheet 20 is bonded to itself at various locations to maintain the shape of the cleaning implement 10. In this embodiment, the bonds 26 are separate from the attachment members 24 described above. For example, there are a plurality of bonds 26, with each bond 26 occurring at the neck of each folded portion 40. The bonds 26 may be continuous and run along the length of the folded portion 40 along the longitudinal axis 11 (see FIGS. 1, 2) of the cleaning implement 10, or there may be intermittent bonds 26, so long as the intermittent bonds 26 are capable of maintaining the shape of the cleaning implement 10. The bonds 26 may be of any form suitable for bonding the support sheet 20 to itself, such as adhesive, heat sealing, fusion bonding, or stitching. Further, in this embodiment, the attachment members 24 also secure the cleaning sheets 30 to the support sheet 20.

As discussed above, the support sheet 20 provides the shape and structure of the cleaning implement 10, which includes the plurality of folded portions 40. There may be any number of folded portions 40, but preferably a number of folded portions 40 is such that facilitates effective dusting and ease of use. In the embodiment shown, the cleaning implement 10 has eight folded portions 40, which has been proven to facilitate effective dusting while at the same time enabling easy removal of the cleaning sheets 30.

As shown in FIGS. 1, 2, 5, and 6, the support sheet 20 and cleaning sheets 30 may include a plurality of cuts or slits 50. The slits 50 may be positioned so that they correspond to the folded portions 40. More specifically, in one embodiment the slits 50 are substantially parallel to one another and are oriented in a direction that is substantially perpendicular to the longitudinal axis 11 of the cleaning implement 10. The slits 50 preferably do not extend into the bottom of the valleys 42 because such a configuration may compromise the ability of the attachment members 24 to hold the cleaning sheets 30 together. In other words, extending the slits 50 too far into the valleys 42 may cause the cleaning sheets 30 to separate from one another, which is undesirable.

Accordingly, each folded portion 40 is separated into a series of adjacent loops 53 that are arranged along the folded portion 40. As with the folded portions 40, the loops 53 extend radially outwardly from the longitudinal axis 11, (see FIGS. 1, 2) of the cleaning implement 10. Adjacent loops 53 are therefore capable of moving independent of one another, thus increasing the dusting efficacy of the cleaning implement 10. In the embodiment shown, the slits 50 do not extend into or through the valleys 42 of the support sheet 20 or the cleaning sheets 30.

Figure 7:
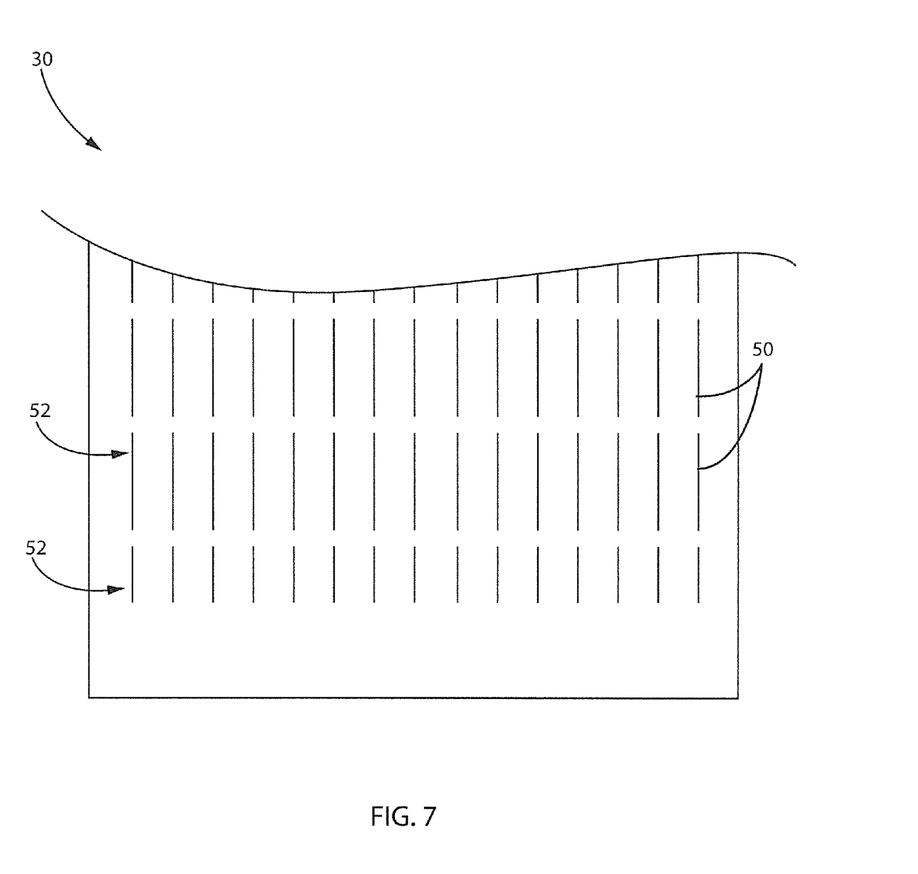
FIG. 7 is a partial top view of a cleaning sheet that may be a component of the cleaning implement of the present invention.
Figure 8:
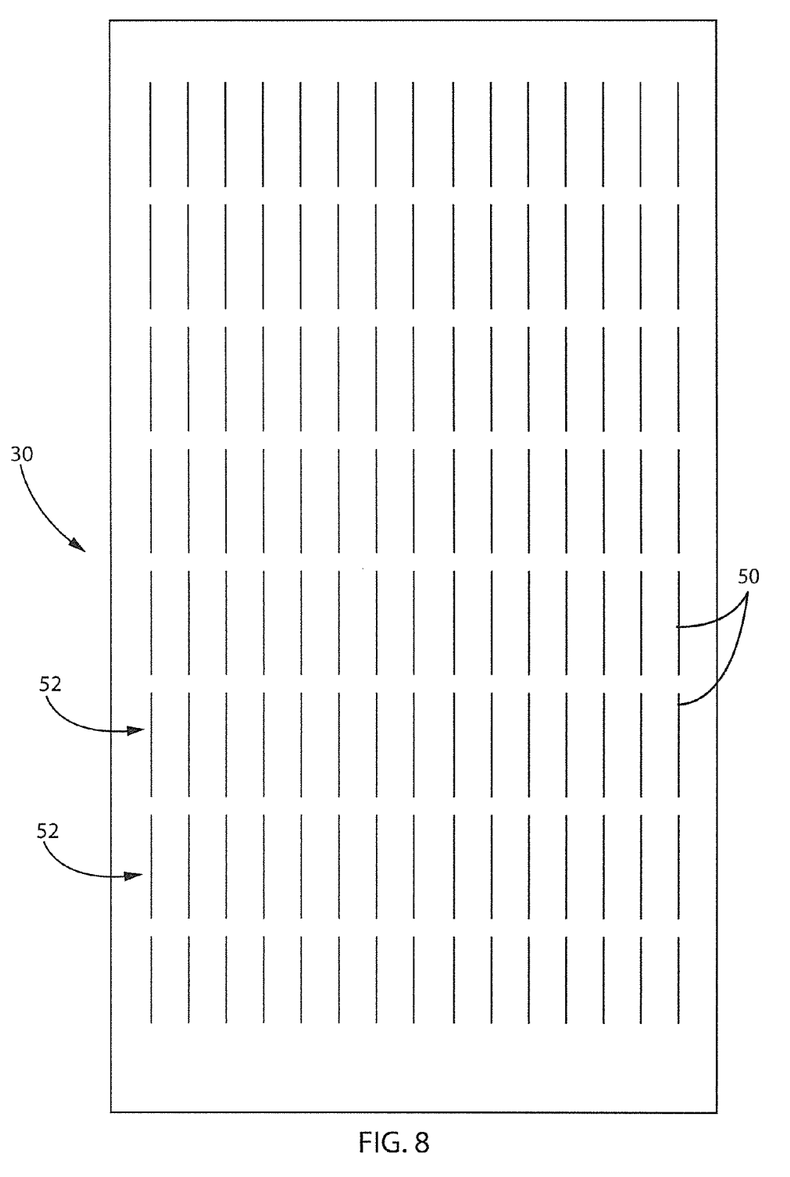
FIG. 8 is a top view of the cleaning sheet of FIG. 7.

Put another way, when the support sheet 20 and cleaning sheets 30 are in a rectangular form, the slits 50 are arranged into slit groups 52, with each slit group 52 organized along a line that is substantially parallel to the longitudinal axis 11 of the cleaning implement 10. See FIGS. 7 and 8. The slit groups 52 are spaced apart in the direction perpendicular to the longitudinal axis 11, with the spaces between the slit groups 52 corresponding to the valleys 42 of the support sheet 20 and cleaning sheets 30.

Figure 1:
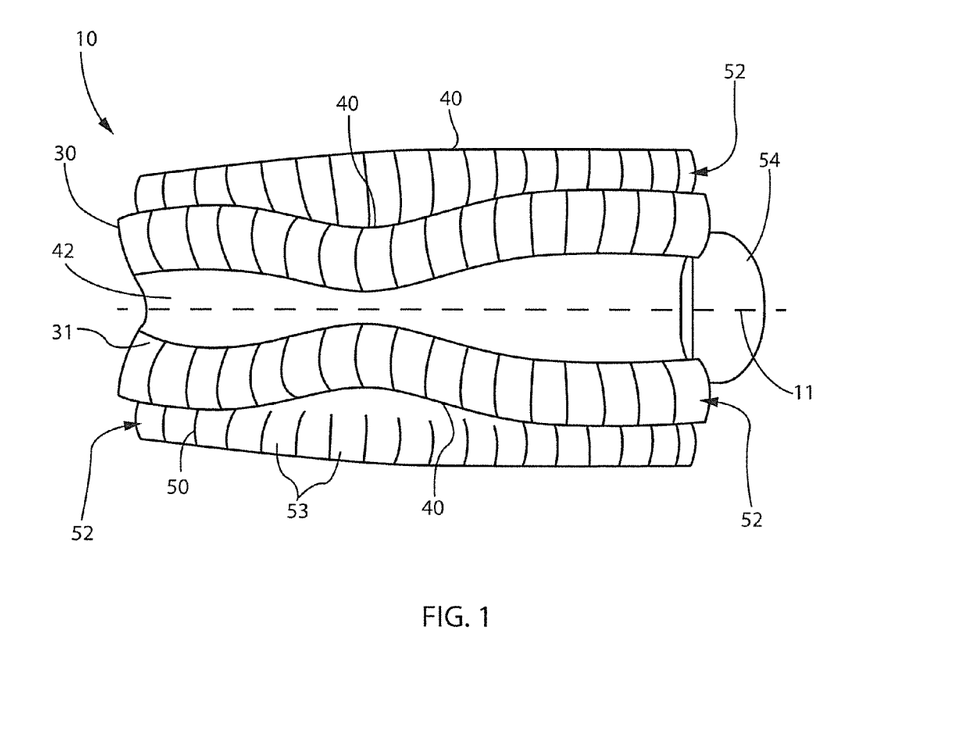
FIG. 1 is a bottom view of one embodiment of the cleaning implement of the present invention.
Figure 2:
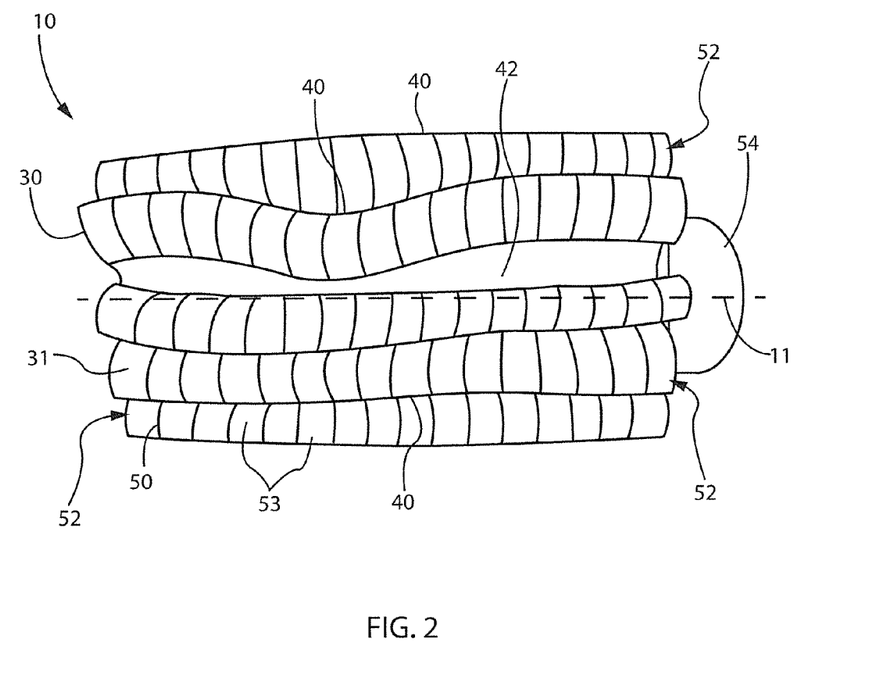
FIG. 2 is a top view of the cleaning implement of FIG. 1.
Figure 3:
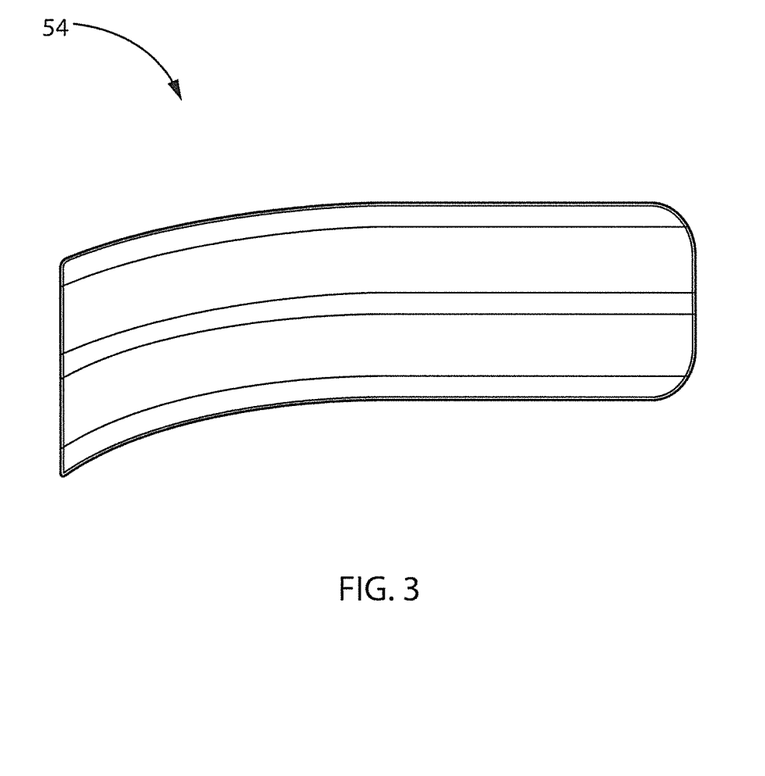
FIG. 3 is a top view of a pocket that may be a component of the cleaning implement of the present invention.
Figure 4:
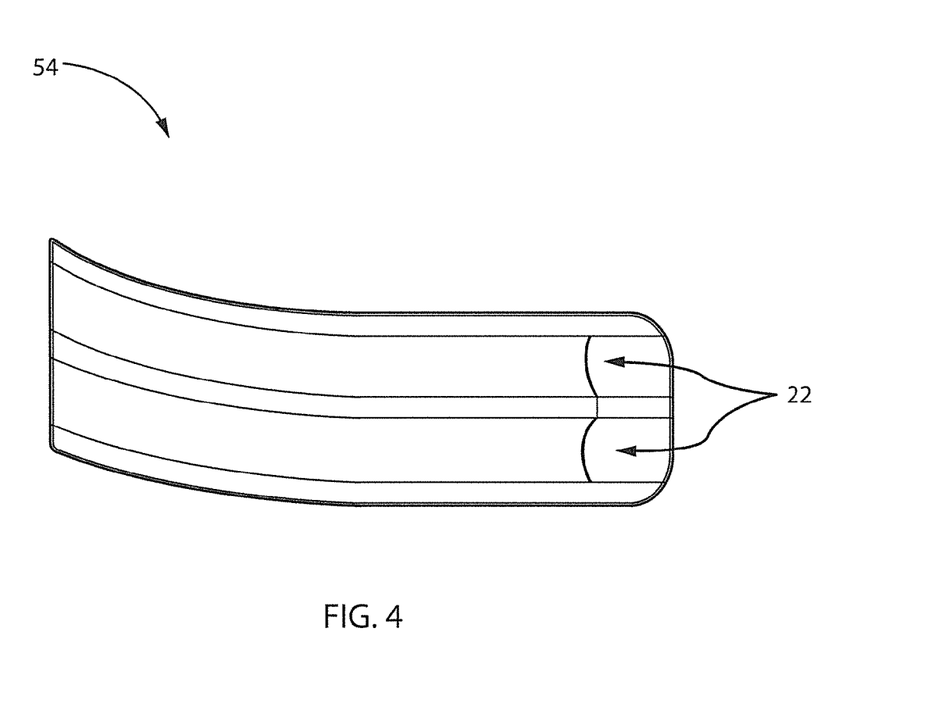
FIG. 4 is a bottom view of the pocket of FIG. 3.
Figure 9:
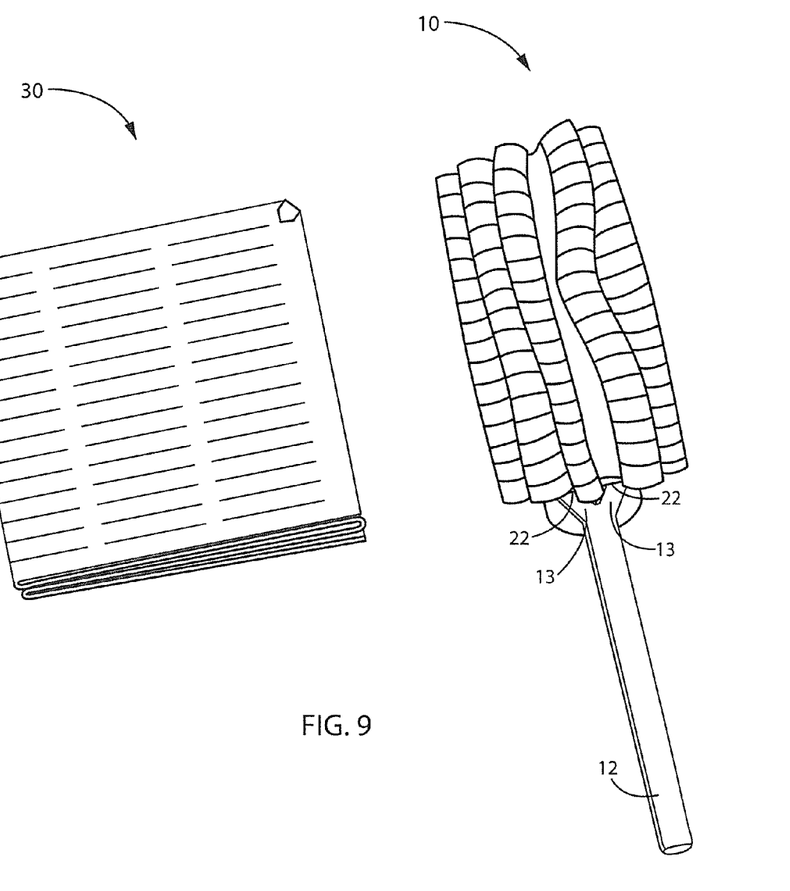
FIG. 9 shows another embodiment of the cleaning implement of the present invention along with a cleaning sheet that is a component of the cleaning implement.

The pocket structure 54, shown in FIG. 4 is configured in such a way that it forms a holding space 22, for receiving a handle 12, e.g., a duster handle, see FIGS. 9, 10. Thus, the cleaning implement 10 may be inserted onto or removed from the handle 12. The handle 12 may have one or more support members 13 that are received by the cleaning implement 10. The pocket structure 54 may be configured in such a way that the holding space 22 comprises multiple spaces to receive multiple support members 13. It is also possible for the support sheet 20 to be configured to form holding spaces 22 to receive a handle 12 having two support members 13, similar to the pocket structure 54 described above. Moreover, the support sheet 20 or pocket structure 54 may be configured to receive the support members 13 on either side, in other words, the support members 13 may be inserted into either end of the cleaning implement 10. In an alternative embodiment, the cleaning implement 10 may include a pocket structure 54 within the holding space 22 to receive the support members 13. For example, the pocket structure 54 may be formed from a separate nonwoven sheet (or sheets) secured together to form the pocket structure. Thus, the support sheet 20 may be formed around the pocket structure 54.

The configuration of the cleaning implement 10 to include folded portions 40 and valleys 42 increases the cleaning surface area of the cleaning implement 10. The cleaning surface area is defined as the surface area of the cleaning implement 10 that is used to clean. Here, the cleaning surface area is the area of one of the cleaning sheets 30. Moreover, taking into consideration the multiple removable cleaning sheets 30, the cleaning surface area of the cleaning implement 10 is multiplied by a factor of however many cleaning sheets 30 there are. Thus, the cleaning implement 10 has a far greater cumulative cleaning surface area than conventional dusters that must be replaced once they become soiled and/or lose cleaning efficacy, as opposed to the cleaning implement 10 that is simply and quickly refreshed by removing the outermost cleaning sheet 30.

The present invention further includes a method of cleaning using a cleaning implement 10 as described above. The method includes providing a cleaning implement 10 as described above, and contacting the cleaning implement 10 with a surface to be cleaned. Then, the cleaning implement 10 is used to trap dust or other debris that is on the surface to be cleaned. The outermost cleaning sheet 30 is then removed from the cleaning implement 10 to expose the next, unused cleaning sheet 30. The cleaning process may then be repeated until there are no more unused cleaning sheets 30 left.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. There are virtually innumerable uses for the present invention, all of which need not be detailed here. All the disclosed embodiments can be practiced without undue experimentation.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

Various alternatives and modifications are contemplated as being within the scope of the following claims particularly pointing out and distinctly claiming the subject matter regarded as the invention. It is intended that the appended claims cover additions, modifications and rearrangements of the invention. Expedient embodiments of the present invention are differentiated by the appended claims.

The invention claimed is:

1. A cleaning implement comprising:
   a) a support having a longitudinal axis;
   b) a plurality of cleaning sheets, each having an outward facing cleaning face and an inward facing attachment face, removably attached to the support;
   c) a plurality of folded portions extending from the cleaning sheets and generally radially from the longitudinal axis of the support; and
   d) a series of slits in the support and the cleaning sheets that form a plurality of loops in the folding portions of the support and the cleaning sheets.

2. The cleaning implement of claim 1, wherein the support is at least one of the following:
   a flexible sheet, a pocket, a cleaning sheet, and an intermediate attachment sheet.

3. The cleaning implement of claim 1, wherein the plurality of cleaning sheets are attached to the support with one of: an adhesive, a stitching, a fusion bonding, and a heat sealing bond.

4. The cleaning implement of claim 1, further including a pocket structure formed from a separate, nonwoven sheet, and wherein the support is attached to the pocket structure.

5. The cleaning implement of claim 1, wherein the plurality of cleaning sheets are layered in a stacked configuration such that only the outward facing cleaning face is exposed to ambient.

6. The cleaning implement of claim 5, wherein the plurality of cleaning sheets are configured to allow detachment of a cleaning sheet, thus exposing to the ambient an additional cleaning sheet in the stacked configuration.

7. The cleaning implement of claim 6, further comprising a final cleaning sheet in contact with the support, wherein the final cleaning sheet includes an indicia visually distinguishing it from the plurality of cleaning sheets.

8. The cleaning implement of claim 7, wherein the indicia of the final cleaning sheet includes a color distinct from a color of the plurality of cleaning sheets.

9. The cleaning implement of claim 1, further comprising a cleaning solution impregnated into the cleaning sheets.

10. The cleaning implement of claim 1, further comprising
a. holding space in the support configured to receive a handle.

11. A cleaning implement comprising:
- a support sheet having a first surface, a second surface, and a longitudinal axis;
- a plurality of detachable cleaning sheets each having an outwardly facing cleaning face and an inwardly facing attachment face supported by the support sheet in a stacked configuration;
- a plurality of folded portions included with the support sheet and the cleaning sheet that extend generally radially from the longitudinal axis of the cleaning implement; and
- a series of slits in the support sheet and the cleaning sheets that form a plurality of loops in the folded portions of the support sheet and the cleaning sheets.

12. The cleaning implement of claim 11, further comprising a means to allow detachment of the inwardly facing attachment face, thus exposing an additional cleaning sheet in the stacked configuration to the ambient.

13. The cleaning implement of claim 12, further comprising a final cleaning sheet in contact with the support sheet, and one cleaning sheet including an indicia visually distinguishing it from the plurality of cleaning sheets for alerting a user to refill the cleaning sheets.

14. The cleaning implement of claim 13, wherein the indicia of the final cleaning sheet includes a color distinct from a color of the plurality of cleaning sheets.

15. The cleaning implement of claim 12, wherein the plurality of cleaning sheets are configured to allow detachment of a cleaning sheet, thus exposing to the ambient an additional cleaning sheet in the stacked configuration.

16. The cleaning implement of claim 11, further comprising a cleaning solution impregnated into the cleaning sheets.

17. The cleaning implement of claim 11, further comprising:
- one of an adhesive, a stitching, a fusion bonding, and a heat sealing bond to attach the plurality of cleaning sheets to each other and the support sheet.

18. The cleaning implement of claim 11, further comprising a holding space in the support sheet configured to receive a handle.

19. The cleaning implement of claim 11, further comprising a support having a longitudinal axis, wherein the support sheet and the cleaning sheets are removably attached to the support.

20. The cleaning implement of claim 19, further including a pocket structure formed from a separate, nonwoven sheet, and wherein the support is attached to the pocket structure.

* * * * *